Patented Jan. 8, 1952

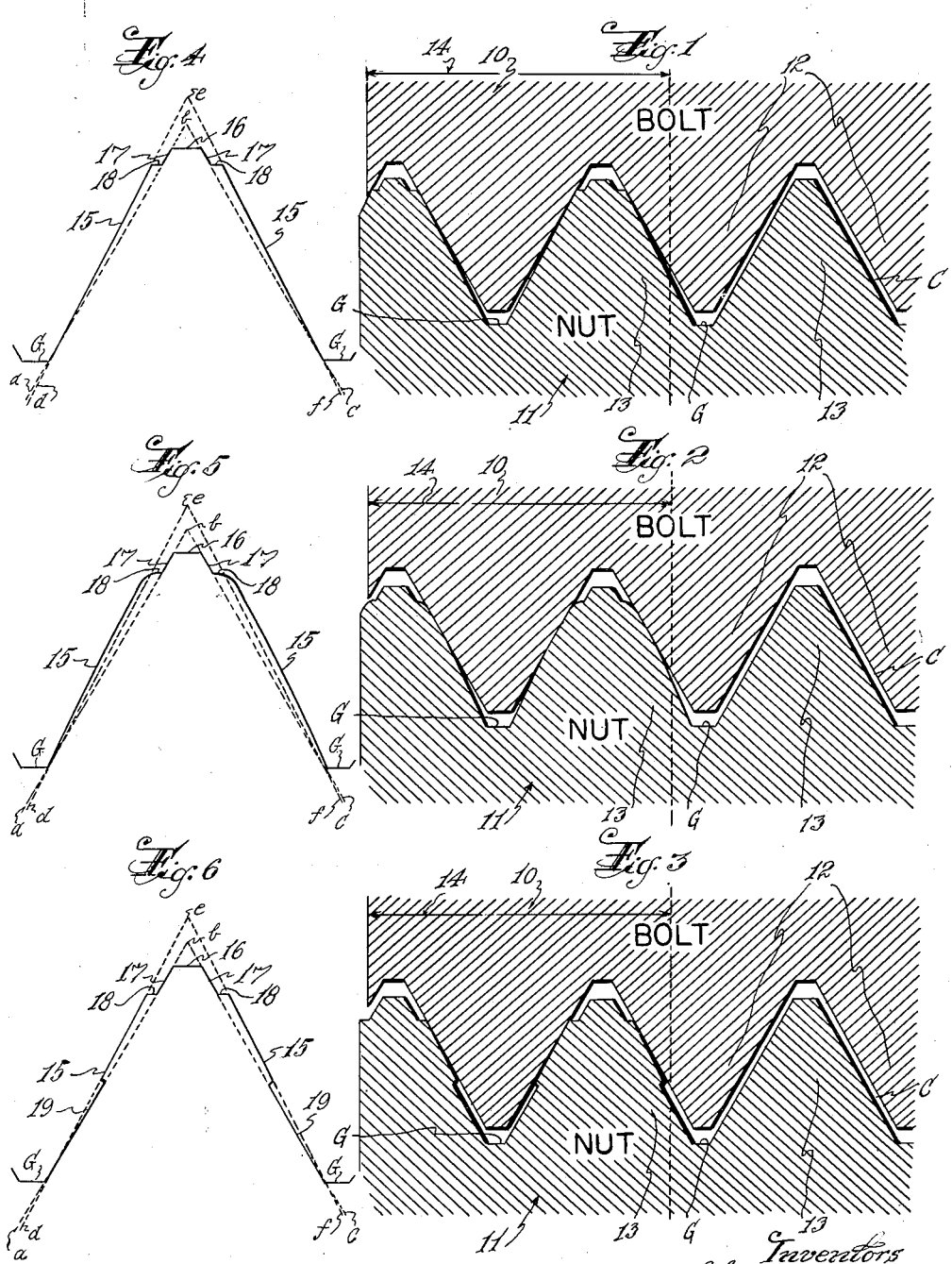

2,581,690

UNITED STATES PATENT OFFICE 2,581,690

LOCKING THREAD STRUCTURE

Walter Moehle and Walter Moehle, Jr., Morristown, N. J.

Application November 30, 1949, Serial No. 130,276

1 Claim. (Cl. 151—21)

The invention relates in general to screw-threaded fastening devices, such as bolts and nuts, and has particular reference to locking means designed to prevent accidental displacement of the coacting threaded members under the influence of vibration or other disturbing forces during use.

More specifically, the invention resides in the class of locking means that involves abnormal modification of the threads of one of the coacting threaded members of a mated male and female pair in order that there will be the desired locking or gripping action between threads of both members.

Prior to our present invention, efforts to obtain satisfactory locking action by thread modification have involved, in most instances, displacement of certain portions or surface areas of the threads of one screw-threaded member from the standard form in such manner and to such a degree that locking interference with the standard threads of the coacting member causes undesirable results that offset the intended advantages. In nearly all of the prior art locking thread structures, the degree of interference developed is so great that high compression or distortion of the displaced thread portions or areas is unavoidable and has to be compensated by "flow" of metal from the areas of interference into any voids that usually are present or may purposely by provided by additional thread modification. Unless adequate provision be made for accommodation of flow, either immediate rupture of one or both of the screw-threaded members, or fatigue that eventually will lead to structural failure, will surely occur.

Furthermore, many of the proposed thread modifications appearing in the prior art are incapable of production by conventional methods of manufacture.

It is our primary object to utilize the thread modification principle but to do so in a new way, which depends largely upon frictional resistance to screw action and only such very slight compression that flow of metal is not involved. The slight compressional distortion of the resistance areas of meeting faces of the threads of both members is readily accommodated by inherent resiliency of the metallic mass. In consequence of this mode of accommodating distortion, complete restoration of thread form following disengagement of the two threaded members will occur and thereby prolong the useful life of the members.

To be more explicit, we accomplish our purpose by reducing the angle of thread below the basic standard throughout a section of the thread of one member of a mated pair. By "angle of thread" is meant the angle included between the side faces of the thread measured in an axial plane. The effect of this angular change is to widen the thread and cause it to fill and even slightly crowd the groove between adjacent threads of a coacting threaded member. Expressed in a different way, the increase in width of the locking thread section is slightly more than equal to the sum of the clearance spaces normally allowed between any standard thread of one screw-threaded member and adjacent standard threads of a coacting screw-threaded member.

Another object of the invention is to incorporate the reduced, or sub-standard, angle of thread in such a manner that there will be no widening of the thread at its root or crest, which otherwise would impede, or even positively block, screw action, except when turning force of such degree is exerted that thread cutting and even rupture of the members will be unavoidable.

A further object has been to devise a locking thread structure that can be made by use of a special tap or die, as the case may be, but in conformity with conventional thread cutting practice.

Other objects and advantages will appear as the following specific description is read in connection with the accompanying drawing, in which:

Fig. 1 is a fragmentary axial cross-sectional view of a pair of mated screw-threaded members, showing part of the thread of one member modified in accordance with the invention to provide a locking section;

Fig. 2 is a similar view showing an alternative form of thread modification;

Fig. 3 is a similar view showing a still further modification;

Fig. 4 is a diagrammatic view on an enlarged scale of the locking thread structure shown in Fig. 1;

Fig. 5 is a similar view of the locking structure shown in Fig. 2; and

Fig. 6 is a similar view of the locking structure shown in Fig. 3.

Referring in detail to the drawing, in which like reference characters indicate corresponding parts in the several views, Fig. 1 illustrates the fundamental embodiment of the invention incorporated in the threads of one screw-threaded member of a mated pair.

For convenience of reference, the member designated by numeral 10 will be considered to be a bolt and the member 11 to be a nut, but it is to be understood that the invention has application to any two mated male and female screw-threaded members, such as a bolt and a tapped hole or other threaded socket in a structural member, or the coacting members of a turnbuckle.

In accordance with our invention, all of the threads of one screw-threaded member are of standard form, whereas the other member has some standard threads and a locking section embracing approximately one and one-half thread turns that are of modified, or sub-standard form. In the illustrative embodiment shown in Fig. 1, threads 12 of bolt 10 are of standard form in every respect, as are threads 13 of nut 11. Locking thread section 14, on the other hand, while conforming to a recognized standard in pitch and nearly all other basic dimensions and relations, differs from the standard form of threads 12 and 13 in one basic respect and that is the angle of thread. In this instance, the angle of thread is sub-standard, which means that the angle included between the side faces is of less degree than the corresponding angle of a standard thread. Incidentally, the standard threads 12 and 13 in the drawing are American Standard in form, but it is to be understood that any other generally recognized standard is embraced by the term "standard" as used herein in the specification and claims.

While locking thread section 14 may be located anywhere between the ends of nut 11, or may even occupy the entire length of the nut thread, it is preferred to locate it at the trailing end, because in this way locking action will be delayed until all of the nut's standard, loosely fitting threads 13 have become securely engaged with the leading threads of bolt 10. This partial application of the nut to the bolt may be accomplished easily and quickly, which oftentimes is highly desirable, as when the structural elements being united by the bolt and nut are difficult to hold in position for proper registration of the bolt holes.

Fig. 4 supplements Fig. 1 in the disclosure of the precise angular relation of the side faces of the fundamental form or model of our improved locking thread as compared with the standard thread form. Broken lines a—b and b—c represent the outline of an imaginary standard thread section corresponding to that of threads 13. Therefore, angle abc is the standard angle of thread. The thread of locking section 14 has been cut so that its side faces 15 are coincident with the sides d—e and e—f of sub-standard angle of thread def. Side faces 15 constitute resistance areas on both the load carrying and non-load carrying sides of the thread for the desired thread locking action and hereinafter will be termed "resistance areas 15." It will be observed that the reduction in angle of thread has been applied in such a manner that resistance areas 15 merge with lines a—b and b—c at the thread root. In other words, line d—e intersects line a—b and line e—f intersects line b—c at the bottom of groove G at opposite sides of locking thread section 14. Due to this provision, the locking thread section will have standard width at its root and the standard width of groove G will not be affected. Consequently, standard clearance allowance is retained along each side of locking thread section 14 at the root. However, the clearance allowance diminishes gradually from the root outward to the region where resistance areas 15 protrude axially far enough to equal in projection the total clearance space between any two coacting standard threads of the bolt and nut when in threaded engagement.

At this juncture, it should be remarked that variations between the standard and sub-standard thread forms as represented in the drawings, and particularly in the diagrammatic views, are greatly exaggerated in degree to facilitate comparison. In the actual thread structure, these variations are virtually microscopic.

Since the locking efficiency of our improved thread structure depends primarily upon the degree of frictional resistance created between the resistance areas of the locking thread section of nut 11 and the adjoining side faces of the threads of bolt 10, it is desirable in most instances to provide resistance areas of maximum practicable radial extent. However, it also is a characteristic of our locking thread structure that there is to be no increase in width of the crest beyond that established by the basic standard. In order to satisfy this additional requirement, the resistance areas 15 of locking thread section 14 have been chamfered along the thread periphery or crest 16. This chamfering has produced outer marginal side face portions 17 and shoulders 18. Side face portions 17 preferably coincide with lines a—b and b—c of the standard thread form in order that crest 16 may conform to standard width. The radial extent, or breadth, of side face portions 17 should be such that shoulders 18 will just slightly exceed the width of standard clearance C.

In the operation of screwing nut 11 onto bolt 10, after locking thread section 14 of the nut has reached the leading bolt thread 12, resistance areas 15 of the said section 14 will enter clearance space C and gradually fill the same as the nut rotation progresses. When locking thread section 14 has become fully engaged with the leading bolt threads as shown in Fig. 1, resistance areas 15 will have completely filled clearance space C and, in addition, actually crowded groove G to a moderate degree and yet sufficiently to cause strong locking or thread-gripping action. As has been stated hereinbefore, the desired locking action will be attained by frictional resistance and very slight compression, which latter is compensated by resilient distortion of the metallic thread mass instead of by metal flow. As the leading portion of locking thread section 14 initially engages the leading thread 12 of bolt 10, the distortion just mentioned will take the form of thread bending, which, of course, will be of infinitesimal degree. Thereafter, as locking thread section 14 becomes embraced by adjoining threads 12 of bolt 10, the distortion will become more in the nature of axial squeezing, but still not enough to cause metal flow. Due to the precise geometrical arrangement of resistance areas 15, i. e. radially following lines d—e and e—f of the reduced angle of thread, the friction, compression and bending stress effects will be exerted initially in the region of the shoulders 18 of resistance areas 15, as illustrated particularly in connection with the outermost (left) nut thread convolution in Figs. 1, 2 and 3, and thus at points as remote as practicable from the thread roots, which is to be desired. It was for this purpose, as well as to afford the maximum resistance area obtainable, that the sub-standard angle of thread for the locking thread section 14 was devised.

When nut 11 has reached the position on bolt 10 shown in Fig. 1, the resistance to turning movement developed by the means and in the manner just described will be sufficient to lock the nut against accidental rotation, as intended, but that resistance can be overcome by the use of a wrench in order that the nut may be screwed tight against the work (not shown). Conversely, when loosening or completely removing nut 11 from bolt 10, the use of a wrench will be required at least until locking thread section 14 of the nut has cleared the leading, or outer threads 12 of bolt 10. Ordinarily, however, it will be possible to make the first and last few turns of the nut in starting it on the bolt and in taking it off, respectively, by direct application of one's fingers to the nut.

When incorporating the sub-standard locking thread section in the screw threads of a tapped hole or socket, the said section should be located preferably at the inner end of the hole or socket in order that locking action will not occur until the coacting stud-bolt has been screwed in to the full extent required. This arrangement is not compulsory but will facilitate rapid and easy threading of the nut from one terminal position to the other.

Figs. 2 and 5 disclose a locking thread structure that embodies the principle of our invention in a modified form intended for heavy duty, as will be explained presently. This heavy duty embodiment differs from the fundamental form shown in Figs. 1 and 4 in a single respect. Instead of being flat, each of the resistance areas is curved in an axial plane so as to be convex in form from the thread root to shoulder 18. The purpose of this curvature is to increase resistance to rotation by the presentation of portions of the resistance areas that bulge outwardly to a slight degree beyond the remaining portions and therefore must be flattened by compression into the fundamental form illustrated in Figs. 1 and 4 to permit progress of nut 11 in its engagement with bolt 10. Again, the degree of compression will be so slight that the elasticity of the metallic mass will prevent flow and permanent distortion. The curvature of the modified resistance area 15 may be varied somewhat without departing from the scope of the invention, but it is preferred to adopt the parabolic curve shown in Figs. 2 and 5, which has its point of maximum ordinate located radially outward from the point of origin, for the reason that maximum protrusion will occur in the region of shoulders 18, where it is desired to exert the greatest bending stress on the coacting bolt thread. In describing the angular relation of the curved resistance areas 15, it may be stated that their general inclination with respect to each other is less than the standard angle of thread.

The locking thread structure with curved resistance areas is peculiarly adapted for incorporation in the threads of a tapped socket such as is employed in heavy machine bases or engine mounts to provide for relatively permanent and exceptionally secure attachment of machines that are subject to severe vibration. An example is engine mounts in aircraft, wherein any displacement of the stud bolts in their sockets would create a hazardous condition in flight. In any such heavy duty application of our locking thread structure, it may be advisable to follow the general practice of extending the said locking thread structure throughout the length of the modified screw-threaded member.

Figs. 3 and 6 illustrate a still further modification intended for adoption in the manufacture of small-diameter screw-threaded members, which do not require such a high degree of locking resistance. In this embodiment, resistance areas 15 conform throughout to the sides of sub-standard angle of thread *def*, but their radial extext has been reduced by chamfering the outer periphery of the thread 14 to a greater depth radially and by cutting a shallow groove along the thread root to provide inner face portions 19 that coincide with lines *a—b* and *b—c* of the standard angle of thread. The sole purpose of this departure from the fundamental structure shown in Figs. 1 and 4 has been to reduce the resistance area and thereby weaken the locking action in proportion to the requirements in a small-diameter nut or equivalent screw-threaded member. This embodiment of the invention might be termed a "light duty model" in contrast with the heavy duty model illustrated in Figs. 2 and 5.

It has been found to be practicable in the manufacture of nuts having either of the three illustrated embodiments of our improved locking thread structure to use a tap which has been provided with thread-cutting elements of the required cross-sectional form. With this special tap, the locking thread section may be cut in such a manner that it merges smoothly with the standard thread section. This desirable result is practicable also in the use of a similarly constructed die for applying our sub-standard locking thread structure to bolts or equivalent male screw-threaded members. The special taps or dies for cutting our locking thread structure are well adapted for use in conventional thread cutting machines.

Having thus described our invention, we claim:

A screw-threaded member having a locking thread section conforming to basic standard dimensions except that its load carrying and non-load carrying side faces are so constructed and arranged as to present resistance areas whose inclination with respect to each other is less than the standard angle of thread, the peripheral portion of said locking thread section being chamfered on both sides to provide a crest of standard width and shoulders spaced radially inward from said crest and projecting axially therefrom to an extent slightly in excess of the normal clearance allowance, said resistance areas being generated by straight lines intersecting the rotational axis and having an included angle such that said generatrix lines intersect the points of the respective shoulders and the meeting points of the sides of the thread root with the bottoms of the adjacent grooves between threads, whereby operative engagement of the locking thread section of said screw-threaded member with standard threads of a coacting screw-threaded member during relative threading rotation will cause locking action between both members through friction distributed over a large contact area and involving initial axial bending of the locking thread section followed by compression of the resistance areas of said locking thread section propagated radially inward from the shoulders and minimized by axial bending of the said standard threads to a degree within the elastic limit of the metallic thread mass, thereby avoiding metal flow.

WALTER MOEHLE.
WALTER MOEHLE, Jr.

REFERENCES CITED

The following references are of record in the file of this patent:

UNITED STATES PATENTS

| Number | Name | Date |
|---|---|---|
| 271,852 | Hull | Feb. 6, 1883 |
| 341,145 | Howes | May 4, 1886 |
| 597,000 | Higbee | Jan. 11, 1898 |
| 658,085 | Higbee | Sept. 18, 1900 |
| 1,451,484 | Woodward | Apr. 10, 1923 |
| 2,301,181 | Ilsemann | Nov. 10, 1942 |
| 2,371,365 | Tomalis | Mar. 13, 1945 |
| 2,437,638 | Evans | Mar. 9, 1948 |